United States Patent [19]

Tomita et al.

[11] Patent Number: 5,444,125
[45] Date of Patent: Aug. 22, 1995

[54] AMINATED OLEFIN POLYMERS

[75] Inventors: Masayuki Tomita; Hideshi Uchino; Toshihiko Sugano; Takashi Fujita; Mitsutoshi Aritomi, all of Yokkaichi, Japan

[73] Assignee: Mitsubishi Petrochemical Company Limited, Tokyo, Japan

[21] Appl. No.: 876,037

[22] Filed: Apr. 30, 1992

[30] Foreign Application Priority Data

Apr. 30, 1991 [JP] Japan .................................. 3-098821

[51] Int. Cl.$^6$ ................................................ C08F 8/32
[52] U.S. Cl. .................................... 515/293; 525/296; 525/333.7; 525/378; 525/379; 525/381; 525/382; 526/83
[58] Field of Search ..................... 525/333.7, 293, 296; 526/83

[56] References Cited

U.S. PATENT DOCUMENTS

| | | | |
|---|---|---|---|
| 3,255,130 | 6/1966 | Keim | 260/8 |
| 4,634,744 | 1/1987 | Hwang et al. | 526/83 |
| 4,701,504 | 10/1987 | Mitchell et al. | 526/83 |

FOREIGN PATENT DOCUMENTS

| | | |
|---|---|---|
| 0295026 | 12/1988 | European Pat. Off. . |
| 0351392 | 1/1990 | European Pat. Off. . |
| 0372295 | 6/1990 | European Pat. Off. . |
| 2089769 | 7/1972 | France . |
| 2376169 | 7/1978 | France . |
| 1378708 | 12/1974 | United Kingdom . |

*Primary Examiner*—Bernard Lipman
*Attorney, Agent, or Firm*—Oblon, Spivak, McClelland, Maier & Neustadt

[57] ABSTRACT

An aminated polymer having excellent adhesion, printability, and compatibility in polymer blends or the like which are obtained by introducing an amino group, into an isotactic α-olefin polymer having an olefinic unsaturated bond at its terminus is disclosed. The terminal unsaturated isotactic or syndiotactic α-olefin polymer is obtained by polymerizing an α-olefin with a catalyst comprising the combination of a metallocene compound and an alumoxane, and the amino group is obtained by the amination of the terminal unsaturated group, by the addition of a compound containing the corresponding functional group to the unsaturated bond, or by the conversion of a precursor polymer containing a precursor of the functional group into a polymer containing the functional group desired.

24 Claims, No Drawings

AMINATED OLEFIN POLYMERS

BACKGROUND OF THE INVENTION

The present invention relates to aminated olefin polymers which have excellent adhesion, printability, and compatibility in polymer blends or the like, and which are obtained by introducing an amino group into α-olefin polymers having an olefinic unsaturated bond at the end.

1. Field of the Art

Homopolymers or copolymers of α-olefins, which herein include ethylene, have excellent properties such as mechanical strength, gloss, transparency, moldability, moisture resistance, chemical resistance or the like in addition to their inexpensiveness. The α-olefin polymers, however, are non-polar in their molecular structure and poor in affinity to other materials and thus have inferior properties such as adhesion, printability, compatibility in polymer blends or the like.

2. Related Art

Accordingly, attempts have hitherto been made to introduce a variety of functional groups into the α-olefin polymers in order to improve their properties. An amino group among the functional groups is believed to be very useful, as it reacts rapidly with a variety of the other functional groups such as a carboxylic acid group, an epoxy group, or the like to produce a corresponding chemical bond. Polymers having a functional group introduced at their terminus are important as thermoplastics as themselves and, in addition, as modifiers as solubilizing agents for resins.

It has been proposed to introduce a functional group to a terminus of a polyolefin. For instance, it is proposed to graft a carboxylic acid or its anhydride onto a polyolefin (Japanese Patent Laid-Open Publication Nos. 23904/1988, 37102/1988 and 173008/1990). Introduction of a halogen atom is proposed in Japanese Patent Laid-Open No. 158709/1987. Introduction of a hydroxyl group into a polyolefin and of an epoxy group into a polyolefin are also proposed in Japanese Patent Laid-Open Nos. 132604/1989 and 132605/1989, respectively.

It has also been known to introduce an amino group into a polyolefin. For instance, Japanese Patent Publication No. 15792/1979, and Japanese Patent Laid-Open Publication Nos. 77687/1979 and 313508/1989 disclose to react an amine with a polyolefin having a glycidyl group which has been introduced thereinto thereby to introduce an amino group to a polyolefin. These proposals of course require epoxidation of a polyolefin before the amination, and amination solely at a terminus of the polyolefin may, to the best of our knowledge, be difficult. Japanese Patent Laid-Open Publication No. 140212/1990 discloses to add an amino group-containing ethylenically unsaturated monomer to a polyolefin by means of a radical initiator, but this method may again be such that amination solely at a terminus of a polyolefin would be difficult. Japanese Patent Laid-Open Publication No. 44203/1989 discloses to introduce a primary amino group to an anion living polymer whereby amination at a terminus of a polyolefin may be feasible, but the method is restricted to a polymer of a monomer which undergoes anionic polymerization.

SUMMARY OF THE INVENTION

An object of the present invention is to solve the aforementioned problems. This object is achieved by introducing an amino group to an olefin polymer having an olefinic unsaturation at its terminus.

More particularly, the present invention presents an aminated olefin polymer which is such a modified α-olefin polymer, the α-olefin polymer comprising at least one α-olefin of 2 to 20 carbon atoms polymerized and having an olefinic unsaturated bond at its terminus, that the α-olefin polymer has been modified to have an amino group introduced into the olefinic unsaturated bond at the terminus.

The aminated polymers according to the present invention have a highly reactive amino group in their molecules and have excellent adhesion relative to materials such as various inks, paints, aluminium and the other metals. The polymers according to the present invention also exhibit superior compatibility with another resin and compatibilizing effect in the polymer blends with the other resins and thus can improve the impact resistance, for example, of a polymer blend of polyphenylene ether and polypropylene as in Application Example-1 presented hereinafter.

The aminated polymers according to the present invention are also free from the problems of gelation and disintegration of molecules during fabrication such as molding. The polymer according to the present invention is also excellent from the viewpoint of economy, as it requires no expensive special monomers such as non-conjugated diene and is produced in a high yield relative to the catalyst.

DETAILED DESCRIPTION OF THE INVENTION

Unsaturated Polymers to be Modified

The unsaturated polymers to be aminated in the present invention comprise at least one of α-olefins having 2 to 20, preferably 2 to 12 carbon atoms, and have an olefinic unsaturated bond at its terminus. These polymers may be characterized by the fact that substantially all of one terminus of the polymer chains assumes a vinylidene bond. The unsaturated polymer can be of any molecular weight, which is generally in the range of 1,000 to 1,000,000, preferably 2,000 to 500,000, more preferably 5,000 to 200,000 as the number average molecular weight measured by gel permeation chromatography.

The unsaturated polymer may preferably have [mm] or [rr] fraction of a triad of at least 0.5, preferably at least 0.6 and more preferably at least 0.75, determined by means of $^{13}$C-NMR.

The term "[mm] fraction" or "[rr] fraction" as herein used means the ratio (y/x) of the number y of triads having the [mm] structure or the ratio (z/x) of the number z of triads having the [rr] structure to the total number x of the three stereoisomeric structures, that is, [mm] (isotactic), [mr] (heterotactic) and [rr] (syndiotactic) which can be taken by the "triad" which is the minimum unit of the stereostructure as the monomer unit in the α-olefin polymers, that is, the "trimer".

The measurement of $^{13}$C-NMR was conducted with a JEOL. FX-200 spectrometer manufactured by a Japanese corporation Nippon Denshi, under the measuring conditions of a temperature of 130° C., a frequency of 50.1 MHz, a spectrum width of 8,000 Hz, a pulse repeating time of 2.0 seconds, a pulse width of 7 μseconds and an integration number of 10,000 to 50,000. The spectrum obtained was analyzed on the basis of the analytical methods described by A. Zambelli, Macromolecules, 21, 617 (1988) and Tetsuro Asakura, Abstracts of The Society of Polymer Science, Japan, 36 (8), 2408 (1987).

These unsaturated polymers can be prepared, as is described hereinafter, by contacting an α-olefin with a catalyst comprising particular components (A) and (B) thereby polymerize the α-olefin.

α-olefins

As the examples of the α-olefins used in the present invention, having 2 to 20 carbon atoms, preferably 2 to 12 carbon atoms, ethylene, propylene, 1-butene, 1-hexene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allylcyclohexane, allylbenzene, 3-cyclohexyl-1-butene, vinylcyclopropane, vinylcyclohexane, and 2-vinylbicyclo[2,2,1]heptane can be mentioned. Preferred examples among these α-olefins are ethylene, propylene, 1-butene, 1-hexene, 3-methyl-1-butene, 3-methyl-1-pentene, 4-methyl-1-pentene, and 3-methyl-1-hexene, particularly ethylene, propylene, 1-butene, 3-methyl-1-butene and 4-methyl-1-pentene. These α-olefins may be used alone or in combination of the two or more thereof. When two or more α-olefins are used, these α-olefins may be distributed at random or in blocks within the unsaturated polymer formed.

More preferable α-olefin is propylene or a mixture of propylene with another α-olefin in which propylene predominates.

Catalysts

The unsaturated polymers used in the present invention can be prepared by contacting the aforementioned α-olefin with a catalyst thereby to polymerize it, the catalyst comprising the Components (A) and (B) which will be described below. In this connection, the term "comprising" means that the components for the catalyst are not only those named, viz. (A) and (B), but may include other appropriate components which will not interfere with the nature of the present invention.

Component (A)

The Component (A) is a metallocene compound and specifically a transition metal compound represented by the following general formula:

$$Q_a(C_pR^1{}_m)(C_pR^2{}_n)MeXY \qquad [I]$$

wherein: Q represents a bonding group which crosslinks the cyclopentadienyl groups $(C_pR^1{}_m)$ and $(C_pR^2{}_n)$; a denotes an integer of 0 or 1, preferably 1; $C_p$ represents a cyclopentadienyl group or a substituted cyclopentadienyl ring; $R^1$ and $R^2$ independently represent hydrocarbyl groups or oxygen-, phosphorus-, nitrogen- or silicon-containing hydrocarbyl groups, the hydrocarbyl group being in a linear or a branched configuration; Me represents a transition metal of the groups IVB–VIB in the Periodic Table; X and Y represent independently a hydrogen atom, a halogen atom, a hydrocarbyl group, an alkoxy group, an amino group, a phosphorus-containing hydrocarbyl group or a silicon-containing hydrocarbyl group, in which X and Y may be the same or different; m represents an integer in the range of $0 \leq m \leq 5$ and n represents an integer in the range of $0 \leq n \leq 5$ whereby, when m (or n) is more than one, a plurality of $R^1$ (or $R^2$) can be connected at their terminus to form a ring structure together with the carbon atoms in the cyclopentadienyl group to which $R^1$ (or $R^2$) is bonded and a plurality of each of $R^1$ and $R^2$ may be the same or different; and $(C_pR^1{}_m)$ and $(C_pR^2{}_n)$ preferably represent the same structures.

Q, $R^1$, $R^2$, $C_p$, Me, X and Y in the general formula [I] are described in detail below.

Q is a bonding group which crosslinks the cyclopentadienyl groups indicated and specifically includes (i) an alkylene group such as a methylene group, an ethylene group, an isopropylene group, or a diphenylmethylene group; (ii) a mono or oligo silylene group which may or may not have a hydrocarbyl substituent on the silicon atom such as a lower alkyl, such as a silylene group, a dimethylsilylene group, a disilylene group, or a tetramethyldisilylene group; and (iii) a hydrocarbyl group containing germanium, phosphorus, nitrogen, boron or aluminium, wherein the hydrocarbyl group or the hydrocarbyl moiety in these groups (i)–(iii) may have 1 to 30, preferably 1 to 20 carbon atoms in total. Q is preferably a $C_1$ to $C_3$ alkylene group which may or may not have a hydrocarbyl substituent thereon, preferably a lower alkyl, having 1 to 20 carbon atoms in total or a silylene group, more preferably a alkylene group.

$R^1$ and $R^2$ represent independently a hydrocarbyl group having 1 to 20, preferably 1 to 12 carbon atoms, or an oxygen-, phosphorus-, nitrogen- or silicon-containing hydrocarbyl group having 1 to 20, preferably 1 to 10 carbon atoms. Typically, $R^1$ and $R^2$ are each monovalent substituent, but it is within the scope of the present invention that $R^1$ and $R^2$ are each divalent substituents whereby two of $R^1$ or two of $R^2$ can bond together to form a ring. If either $R^1$ and $R^2$ is present in plurality, these groups may be the same or different.

$C_p$ is a cyclopentadienyl group or a substituted cyclopentadienyl ring, the substituent, viz. $R^1$ and $R^2$, being a hydrocarbyl group having 1 to 20, particularly 1 to 12 carbon atoms. One of the typical examples of the hydrocarbyl group is an alkyl group. Another typical example is an alkylene or alkenylene group which forms a fused ring together with the cyclopentadienyl group. Thus, $C_p$ includes a conjugated five-membered ring such as indene or fluorene in addition to the cyclopentadiene, and, since the alkylene or alkenylene group can be one in the form of a branched chain, these fused five-membered rings can thus be ones having a hydrocarbyl substituent.

Me is a transition metal of the groups IVB-VIB, preferably the group IVB, in the Periodic Table, preferably Ti, Zr or Hf.

X and Y represent independently (i) a hydrogen atom, (ii) a halogen atom, (iii) a hydrocarbyl group having 1 to 20, preferably 1 to 10 carbon atoms, (iv) a silicon-containing hydrocarbyl group having 1 to 40, preferably 1 to 20 carbon atoms, (v) an alkoxy group having 1 to 20, preferably 1 to 10 carbon atoms, (vi) an amino group or (vii) a carbon-containing amino group having 1 to 10 carbon atoms, in which X and Y may be the same or different.

m denotes an integer in the range of $0 \leq m \leq 5$, and n denotes an integer in the range of $0 \leq n \leq 5$, and $(C_pR^1{}_m)$ and $(C_pR^2{}_n)$ preferably represent the same structures.

Specific examples of the Component (A) in which Me is zirconium include:

(1) bis(cyclopentadienyl)zirconium dichloride,
(2) bis(methylcyclopentadienyl)zirconium dichloride,
(3) bis(dimethylcyclopentadienyl)zirconium dichloride,
(4) bis(trimethylcyclopentadienyl)zirconium dichloride, (5) bis(tetramethylcyclopentadienyl)zirconium dichloride,
(6) bis(pentamethylcyclopentadienyl)zirconium dichloride,
(7) bis(indenyl)zirconium dichloride,
(8) bis(fluorenyl)zirconium dichloride,
(9) bis(cyclopentadienyl)zirconium monochloride monohydride,
(10) bis(cyclopentadienyl)methylzirconium monochloride,
(11) bis(cyclopentadienyl)ethylzirconium monochloride,
(12) bis(cyclopentadienyl)phenylzirconium monochloride,
(13) bis(cyclopentadienyl)zirconium dimethyl,
(14) bis(cyclopentadienyl)zirconium diphenyl,
(15) bis(cyclopentadienyl)zirconium dineopentyl,
(16) bis(cyclopentadienyl)zirconium dihydride,
(17) (cyclopentadienyl)(indenyl)zirconium dichloride,
(18) (cyclopentadienyl)(fluorenyl)zirconium dichloride,
(19) methylenebis(indenyl)zirconium dichloride,
(20) ethylenebis(indenyl)zirconium dichloride,
(21) ethylenebis(indenyl)zirconium monohydride monochloride,
(22) ethylenebis(indenyl)methylzirconium monochloride,
(23) ethylenebis(indenyl)zirconium monomethoxy monochloride,
(24) ethylenebis(indenyl)zirconium diethoxide,
(25) ethylenebis(indenyl)zirconium dimethyl,
(26) ethylenebis(4,5,6,7-tetrahydroindenyl)zirconium dichloride,
(27) ethylenebis(2,4-dimethylcyclopentadienyl)(3′, 4′-dimethylcyclopentadienyl)zirconium dichloride,
(28) isopropylidenebis(indenyl)zirconium dichloride,
(29) isopropylidenebis(2,4-dimethylcyclopentadienyl)-(3′, 4′-dimethylcyclopentadienyl)zirconium dichloride,
(30) dimethylsilylenebis(indenyl)zirconium dichloride,
(31) tetramethyldisilylenebis(indenyl)zirconium dichloride,
(32) dimethylsilylene(4,5,6,7-tetrahydroindenyl)-zirconium dichloride,
(33) dimethylsilylene(2,4-dimethylcyclopentadienyl)-(3′, 4′-dimethylcyclopentadienyl)zirconium dichloride,
(34) dimethylgermanebis(indenyl)zirconium dichloride,
(35) methylaluminiumbis(indenyl)zirconium dichloride,
(36) ethylaluminiumbis(indenyl)zirconium dichloride,
(37) phenylaluminiumbis(indenyl)zirconium dichloride,
(38) phenylphosphinobis(indenyl)zirconium dichloride,
(39) ethylboranobis(indenyl)zirconium dichloride,
(40) methylene(cyclopentadienyl) (3,4-dimethylcyclopentadienyl)zirconium dichloride,
(41) methylene(cyclopentadienyl) (3,4-dimethylcyclopentadienyl)zirconium chloride hydride,
(42) methylene(cyclopentadienyl ) (3,4-dimethylcyclopentadienyl)zirconium dimethyl,
(43) methylene(cyclopentadienyl) (3,4-dimethylcyclopentadienyl)zirconium diphenyl,
(44) methylene(cyclopentadienyl)(trimethylcyclopentadienyl)zirconium dichloride,
(45) methylene(cyclopentadienyl )(tetramethylcyclopentadienyl)zirconium dichloride,
(46) isopropylidene(cyclopentadienyl) (3,4-dimethylcyclopentadienyl)zirconium dichloride,
(47) isopropylidene(cyclopentadienyl)(3-methylindenyl)zirconium dichloride,
(48) isopropylidene(cyclopentadienyl)(fluorenyl)zirconium dichloride,
(49) isopropylidene(2-methylcyclopentadienyl)(-fluorenyl)zirconium dichloride,
(50) isopropylidene(2,5-dimethylcyclopentadienyl)(3′, 4′-dimethylcyclopentadienyl)zirconium dichloride,
(51) isopropylidene(2,5-dimethylcyclopentadienyl)(-fluorenyl)zirconium dichloride,
(52) ethylene(cyclopentadienyl)(3,5-dimethylcyclopentadienyl)zirconium dichloride,
(53) ethylene(cyclopentadienyl)(fluorenyl)zirconium dichloride,
(54) ethylene(2,5-dimethylcyclopentadienyl)(-fluorenyl)zirconium dichloride,
(55) ethylene(2,5-diethylcyclopentadienyl)(-fluorenyl)zirconium dichloride,
(56) diphenylmethylene(cyclopentadienyl) (3,4-dimethylcyclopentadienyl)zirconium dichloride,
(57) diphenylmethylene(cyclopentadienyl) (3,4-diethylcyclopentadienyl)zirconium dichloride,
(58) cyclohexylidene(cyclopentadienyl)(fluorenyl)-zirconium dichloride,
(59) cyclohexylidene(2,5-dimethylcyclopentadienyl) (3′,4′-dimethylcyclopentadienyl)zirconium dichloride,
(60) dimethylsilylene(cyclopentadienyl) (3,4-dimethylcyclopentadienyl)zirconium dichloride,
(61) dimethylsilylene(cyclopentadienyl) (trimethylcyclopentadienyl)zirconium dichloride,
(62) dimethylsilylene(cyclopentadienyl)(tetramethylcyclopentadienyl)zirconium dichloride,
(63) dimethylsilylene(cyclopentadienyl) (3,4-diethylcyclopentadienyl)zirconium dichloride,
(64) dimethylsilylene(cyclopentadienyl)(triethylcyclopentadienyl)zirconium dichloride,
(65) dimethylsilylene(cyclopentadienyl)(tetraethylcyclopentadienyl)zirconium dichloride,
(66) dimethylsilylene(cyclopentadienyl)(fluorenyl)-zirconium dichloride,
(67) dimethylsilylene(cyclopentadienyl) (2,7-di-t-butylfluorenyl)zirconium dichloride,
(68) dimethylsilylene(cyclopentadienyl)(octahydrofluorenyl)zirconium dichloride,
(69) dimethylsilylene(2-methylcyclopentadienyl)(-fluorenyl)zirconium dichloride,
(70) dimethylsilylene(2,5-dimethylcyclopentadienyl)(fluorenyl)zirconium dichloride,
(71) dimethylsilylene(2-ethylcyclopentadienyl)(-fluorenyl)zirconium dichloride,
(72) dimethylsilylene (2,5-ethylcyclopentadienyl)(-fluorenyl)zirconium dichloride,
(73) dimethylsilylene(2-methylcyclopentadienyl)(2,7-di-t-butylfluorenyl)zirconium dichloride,
(74) dimethylsilylene(2,5-dimethylcyclopentadienyl)(2,7-di-t-butyl-fluorenyl)zirconium dichloride,
(75) dimethylsilylene(2-ethylcyclopentadienyl)(2,7-di-t-butylfluorenyl)zirconium dichloride,

(76) dimethylsilylene(diethylcyclopentadienyl)(2,7-di-t-butyl-fluorenyl)zirconium dichloride,
(77) dimethylsilylene(methylcyclopentadienyl)(octahydrofluorenyl)zirconium dichloride,
(78) dimethylsilylene(dimethylcyclopentadienyl)(octahydrofluorenyl)zirconium dichloride,
(79) dimethylsilylene(ethylcyclopentadienyl)(octahydrofluorenyl)zirconium dichloride,
(80) dimethylsilylene(diethylcyclopentadienyl)(octahydrofluorenyl)zirconium dichloride,
(81) dimethylgermane(cyclopentadienyl)(fluorenyl)zirconium dichloride,
(82) phenylamino(cyclopentadienyl)(fluorenyl)zirconium dichloride, and
(83) phenylalumino(cyclopentadienyl)(fluorenyl)zirconium dichloride.

In the present invention, the aforelisted compounds in which chloride has been replaced by bromide or iodide can also be used.

When Me is titanium, hafnium, niobium, molybdenum or wolfram, compounds in which the central metal of the zirconium compounds aforelisted has been replaced by the corresponding metals are examples of such compounds.

Among these compounds, the compounds preferred as the Component (A) are the zirconium compounds and the hafnium compounds. More preferable compounds are compounds in which a equals 1, particularly the zirconium compounds and the hafnium compounds which have a structure crosslinked with an alkylene group.

Component B

The Component B is an alumoxane. The alumoxane is a product obtained by the reaction of one or more than one species of a trialkylaluminium and water. The trialkylaluminium preferably contains 1 to 12 carbon atoms, more preferably 1 to 6 carbon atoms.

Thus, typical examples of the Component (B) include (i) the product derived from one species of trialkylaluminium and water such as methylalumoxane, ethylalumoxane, butylalumoxane, and isobutylalumoxane; and (ii) the product derived from two species of a trialkylaluminium and water such as methylethylalumoxane, methylbutylalumoxane, and methylisobutylalumoxane. Among these alumoxanes, methylalumoxane is particularly preferred. These alumoxanes can be used in combination of the two or more thereof. In the present invention, it is also possible to use the combination of the alumoxane and an alkylaluminium such as trimethylaluminium, triethylaluminium, triisobutylaluminium, and dimethylaluminium chloride.

The alumoxane is generally a cyclic alumoxane represented by the general formula

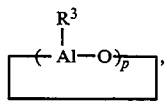

a linear alumoxane represented by the general formula

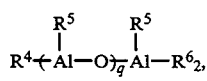

or a mixture thereof, in which $R^3$, $R^4$, $R^5$ and $R^6$ represent independently a hydrocarbyl branch having 1 to 8 carbon atoms, preferably a hydrocarbyl branch having 1 to 4 carbon atoms, most preferably a methyl group, respectively, and p and q each denotes a number in the range of 2 to 100 and 1 to 100, respectively. $q+1$ may be equal to p.

The aforementioned alumoxanes are prepared by a variety of well-known methods. Specifically, the following methods can be mentioned:

(i) the method of the direct reaction of a trialkylaluminium with water in the presence of an appropriate organic solvent such as toluene, benzene, or ether;
(ii) the method of the reaction of a trialkylaluminium with a salt hydride containing water of crystallization such as a hydride of copper sulfate, or of aluminium sulfate; and
(iii) the method of the reaction of a trialkylaluminium with water impregnated into silica gel.

Preparation of Unsaturated Polymers

In the polymerization of the α-olefin in the presence of the catalyst comprising the Components (A) and (B), not only the conventional slurry polymerization method but also the liquid phase solvent-free polymerization method in which substantially no solvent is used, the solution polymerization method or the vapor phase polymerization method can be used. The polymerization can also be conducted by continuous polymerization or batch-wise polymerization or in a fashion of performing preliminary polymerization. As the polymerization solvent in the case of the slurry polymerization, a saturated aliphatic or aromatic hydrocarbon such as hexane, heptane, pentane, cyclohexane, benzene, toluene or a mixture thereof is used. The polymerization temperature is in the range from −78° C. to about 200° C., preferably from 0° to 150° C., more preferably from 50° to 150° C. Hydrogen can also be used as an auxiliary molecular weight regulating agent.

The Component (A) and the Component (B) are used in an atomic ratio of 0.01 to 100,000, preferably 0.1 to 30,000 of the aluminium atom in the Component (B) to the transition atom in the Component (A), (B)/(A). The Component (A) and the Component (B) can be brought into contact separately on polymerization, or they can also be brought into contact preliminarily outside the polymerization reactor.

Modification of Unsaturated Polymers/amination

According to the present invention, the aforementioned unsaturated polymer is modified so that a particular functional group, namely an amino group, is introduced into the olefinic unsaturated bond at the terminus of the polymer.

In the present invention, the introduction of the amino group into the olefinic unsaturated bond means the introduction of the amino group with utilization of the olefinic unsaturated bond. It is possible to introduce the amino group by generating the amino group on the olefinic unsaturated bond or by bonding through e.g. addition reaction a compound containing the amino group to the olefinic unsaturated bond.

The amino group is introduced in an amount of 1% or more, preferably 5% or more, more preferably 10% or more, and most preferably 30% or more, and up to 100%, of the total number of olefinic unsaturated bonds in the mass of the unsaturated polymer. An introduced amount less than 1% results in a low content of the amino group and thus a poor modification effect. The amount of amino group introduced is preferably 30–100%, more preferably 50–100%, most preferably 70–100%.

While the methods for introducing an amino group into the olefinic unsaturated bond at the terminus of the unsaturated polymer are not restricted to specific ones, typical examples of the method of amination of the olefinic unsaturated bond include (i) a reaction of the unsaturated α-olefin polymer with a borane, followed by a reaction with an amination reagent such as hydroxylamine O-sulfonate; (ii) addition of an allylamine through a radical mechanism; (iii) a reaction with a carboxylic acid, a derivative of a carboxylic acid or an anhydride of a carboxylic acid, followed by reaction with a polyamine; (iv) introduction of an amide group to the unsaturated terminus, followed by reduction into an amino group; (v) introduction of an epoxy group, followed by a reaction with ammonia, or a polyamine; and (vi) introduction of a halogen to the unsaturated terminus, followed by a reaction with a polyamine.

The reaction is performed in the swollen or dissolved states of the unsaturated polymer by a solvent or in the melted state thereof. The reaction in the dissolved or melted state is preferred. The solvent used for the reaction should be selected according to the type of the reaction and is often selected from an aliphatic, alicyclic or aromatic hydrocarbon or a halide thereof, an ester having at least 6 carbon atoms, a ketone of at least 3 carbon atoms, an ether of at least 3 carbon atoms and carbon disulfide. These solvents may or may not be used as a mixture of the two or more. The selectivity of the reaction is not required to be 100% in all cases, and the amination products can contain some products by the possible side-reactions, provided that an amino group has been substantially introduced into the products.

AMINATED POLYMER

The aminated and thus functionalized polymers according to the present invention exhibit characteristic properties owing to the aminated group introduced at the end. For instance, the adhesion thereto of various printing inks and paints is excellent, and thus dyeing properties are afforded. It also has excellent adhesion to various metals such as copper and aluminium. Furthermore, the polymer also has excellent adhesion to the other resins. It has permanent antistatic properties and anti-fogging properties. It is also possible to impart properties such as anti-oxidation properties, UV absorption, photosensitivity, fluorescent properties, chromophoric properties, chelating properties or the like to the polymer by introducing compounds having functional groups which exhibit the aforementioned properties with the use of the reactivities of the amino groups introduced in the polymer.

When the aminated polymer in accordance with the present invention is as a blend with a polypropylene resin, a polyethylene resin or a polyphenyleneether resin which has a group or substituent capable of reaction with the amino group contained in the aminated polymer such as an epoxy group, it is possible that the aminated polymer is crosslinked with the polymer through the reaction of the amino group with the fructional group on, e.g., the polypropylene resin.

In addition, the aminated polymers according to the present invention also have excellent mechanical strength.

EXPERIMENTAL EXAMPLES

Examples of Preparation of the Unsaturated Polymer

Preparation of the Catalyst Component (A)

Synthesis of ethylenebis(indenyl)zirconium dichloride (A-1) was conducted in accordance with the methods set forth in J. Orgmet. Chem. (342) 21–29, 1988.

Synthesis of isopropylidene(cyclopentadienyl)(fluorenyl)zirconium dichloride (A-2) was conducted in accordance with the method set forth on page 7 of Japanese Patent Laid-Open Publication No. 41303/1990, Method A.

Preparation of the Catalyst Component (B)

Into 565 ml of a toluene solution containing 48.2 g of trimethylaluminium was poured under agitation 50 g of copper sulfate pentahydrate at 0° C. in portions of 5 g at intervals of 5 minutes. After the addition was completed, the solution was heated to a temperature of 25° C., reacted at 25° C. for 2 hours, further heated to a temperature of 35° C. and reacted for 2 days. A residual solid of copper sulfate was removed, and a toluene solution of alumoxane was obtained. The concentration of methylalumoxane was 27.3 mg/ml (2.7 w/v %).

Preparation of the Resin-A

Into a 1.0-liter stainless steel autoclave equipped with a stirrer and a temperature regulating device were introduced 400 ml of thoroughly dehydrated and deoxygenated toluene, 580 mg of methylalumoxane and 0.418 mg (0.001 mmole) of the component (A-1), and polymerization was conducted at a propylene pressure of 7 kg/cm$^2$G at 40° C. for 4 hours. Upon completion of the polymerization, the polymerization solution was taken out into 3 liters of methanol. The polymer precipitated was separated by filtration and dried, and 180 g of a resin (resin-A) was recovered. As a result of analysis by gel permeation chromatography, the resin was found to have a number average molecular weight (Mn) of $18.7 \times 10^3$ and a molecular weight distribution (Mw/Mn) of 1.99. When the $^{13}$C-NMR was measured with JEOL. FX-200, the [mm] fraction of triad was 0.888, and the one terminus of the polymer chains of the polymer all had vinylidene bonds (0.79 per 1,000 carbon atoms).

Preparation of the Resin-B

Into a 1.0-liter stainless steel autoclave equipped with a stirrer and a temperature regulating device were introduced 500 ml of thoroughly dehydrated and deoxygenated heptane, 580 mg of methylalumoxane and 0.432 mg (0.001 mole) of (A-2) as the component (A), and polymerization was conducted at a propylene pressure of 7 kg/cm$^2$G at 50° C. for 4 hours. After completion of the polymerization, the polymerization solution was taken out into 3 liters of methanol. The polymer precipitated was separated by filtration, and then dried, and 133 g of the resin-B was recovered. As a result of measurement by gel permeation chromatography, the resin was found to have a number average molecular weight (Mn) of $26.9 \times 10^3$ and a molecular weight distribution (Mw/Mn) of 2.21. When the $^{13}$C-NMR was measured, [rr] (triad) was 0.86, and the one terminus of the polymer chains in the polymer all had vinylidene bonds.

Preparation of the Resin-C/glycidylated Polyphenylene Ether

Into a 30-liter stainless steel autoclave were introduced 10 liters of epichlorohydrine and 300 g of poly(2,6-dimethyl-1,4-phenyleneether) in a powder form, produced by Nippon Polyether, Japan, having an intrinsic viscosity of 0.47 dl/g, followed by heating by means of an outside jacket at 100° C. for 30 minutes to dissolve the polymer completely. 50 ml of 10% aqueous caustic soda were added to the solution and a reaction followed under a nitrogen atmosphere at 100° C. for 3 hours. After the reaction, the epichlorohydrine remaining was distilled off in vacuo, and the resultant polymer was dissolved in 5 liters of chloroform. The solid precipitated in the polymer solution, namely NaCl formed and an excess of NaOH added, was filtered off, and a mixture of methanol/water (50/50) was added to the solution thereby to re-precipitate the polymer, which was washed with the same solvent 3 times and dried at 100° C. for 10 hours to give glycidylated polyphenyleneether. The polymer thus obtained was subjected to titration on its solution in toluene according to the method of ISO-3001 to show that the amount of the glycidyl group contained in 100 g of the polymer was $5.6 \times 10^{-3}$ mole.

Preparation of the Resin-D

Into a 1.0-liter stainless steel autoclave equipped with a stirrer and a temperature regulating device were introduced 500 ml of thoroughly dehydrated and deoxygenated heptane, 239 mg of methylalumoxane and 0.618 mg (0.00136 mmole) of (A-1) as the component (A), and polymerization was conducted at a propylene pressure of 7 kg/cm$^2$G at 70° C. for 2 hours. After completion of the polymerization, the polymerization solution was taken out into 3 liters of methanol. The polymer precipitated was separated by filtration, and then dried, and 361 g of the resin-D was recovered. As a result of measurement by gel permeation chromatography, the resin was found to have a number average molecular weight (Mn) of $7.35 \times 10^3$ and a molecular weight distribution (Mw/Mn) of 1.54. When the $^{13}$C-NMR was measured, [mm] (triad) was 0.803, and the one terminus of the polymer chains in the polymer all had vinylidene bonds in an amount of 5.71 per 1000 carbon atoms.

Example 1

Into a dried 200-ml flask were introduced 5 g of the resin-A, 50 ml of toluene and 10 ml of diglyme, followed by agitation at 100° C. to dissolve the resin-A completely. To the solution maintained at 100° C. under agitation was added 6.25 mmole of 9-borabicyclo[3.3.1]-nonane, which will hereinbelow be called 9-BBN, followed by a reaction at 100° C. for 1 hour. To the solution were added 25.0 mmole of ammonium hydroxide and then dropwisely 125 mmole of hypochlorous acid. After a reaction at 100° C. for 2 hours, the solution was poured into methanol acidified by hydrochloric acid thereby to precipitate the polymer, which was separated by filtration and dried in vacuo to give a modified polymer in a yield of 99.5% by weight.

It was determined by NMR spectrometry, nitrogen analysis and IR spectrometry that the polymer had an amino group introduced in a conversion of the terminus unsaturation into the aminated state of 90.8%. The gel permeation chromatography evidenced that the molecular weight of the polymer remained unchanged across the amination reaction.

Example 2

Into a dried 200-ml flask were introduced 5 g of the resin-B, 50 ml of toluene and 10 ml of diglyme, followed by agitation at 100° C. to dissolve the resin-B completely. To the solution maintained at 100° C. under agitation was added 6.25 mmole of 9-BBN, followed by a reaction at 100° C. for 1 hour. To the solution were added 6.25 mmole of hydroxylamine-O-sulfonate. After a reaction at 100° C. for 2 hours, the solution was poured into methanol acidified by hydrochloric acid thereby to precipitate the polymer, which was separated by filtration and dried in vacuo to give a modified polymer in a yield of 97.8% by weight.

It was determined by NMR spectrometry, nitrogen analysis and IR spectrometry that the polymer had an amino group introduced in a conversion of the terminus unsaturation into the aminated state of 91.4%.

Example 3

Into a dried 500-ml flask were introduced 5 g of the resin-D, 50 ml of toluene and 10 ml of diglyme, followed by agitation at 100° C. to dissolve the resin-D completely. To the solution maintained at 100° C. under agitation was added 34.0 mmole of 9-BBN, followed by a reaction at 100° C. for 1 hour. To the solution were added 136.0 mmole of ammonium hydroxide and then dropwisely 680.0 mmole of hypochlorous acid. After a reaction at 100° C. for 2 hours, the solution was poured into methanol acidified by hydrochloric acid thereby to precipitate the polymer, which was separated by filtration and dried in vacuo to give a modified polymer in a yield of 98.7% by weight.

It was determined by NMR spectrometry, nitrogen analysis and IR spectrometry that the polymer had an amino group introduced in a conversion of the terminus unsaturation into the aminated state of 99.1%. The gel permeation chromatography evidenced that the molecular weight of the polymer remained unchanged across the amination reaction.

Application Example 1

The aminated polymer obtained in Example 1, the resin-A and the resin-D in combination as shown in Table 1 given below were kneaded upon fusion at 280° C. for 6 minutes by a plastomill having an internal volume of 60 ml, which was manufactured by Toyo Seiki, Japan, under the conditions of 280° C. and 60 rpm of rotational speed. The resulting mixture was press molded at a temperature of 280° C. into a sheet having a thickness of 2 mm. Various test pieces were cut out from the sheet and subjected to evaluation of physical properties.

Measurement and Evaluation Method (1) Flexural Modulus of Elasticity

A test piece having a width of 25 mm and a length of 80 mm was processed by cutting and subjected to measurement by means of an Instron tester in accordance with JIS K7203.

(2) Izod Impact Strength

As for impact strength, three test pieces having a thickness of 2 mm were superimposed and subjected to measurement of Izod impact strength without notch at 23° C. in accordance with JIS 7110.

Results

Results obtained by the aforementioned measurements are shown in Table 1. As is apparent from Table 1, the compositions with the aminated α-olefin polymer according to the present invention show high impact strength.

TABLE 1

| Test piece No. | (1) | (2) |
| --- | --- | --- |
| Aminated polymer (part by weight) | 60 | — |
| Resin-A*[1] (part by weight) | — | 60 |
| Resin-C*[2] (part by weight) | 40 | 40 |
| Izod impact strength (kg cm/cm$^2$) | 9.3 | 3.5 |
| Flexural modulus of elasticity (kg/cm$^2$) | 9120 | 9050 |

*[1]Polypropylene
*[2]Glycidylated polyphenyleneether

What is claimed is:

1. An aminated olefin polymer which is such a modified α-olefin polymer comprising at least one α-olefin of 2 to 20 carbon atoms polymerized and having an olefinic unsaturated bond at its terminus, that the α-olefin polymer has been modified so that the olefinic unsaturated bond at the terminus has been aminated by generating an amino group on the olefinic unsaturated bond or by bonding through addition reaction a compound containing an amino group to the olefinic unsaturated bond, the amino group being introduced in an amount of 10 to 100% of the total number of olefinic unsaturated bonds in the mass of the unsaturated polymer.

2. The aminated olefin polymer as claimed in claim 1, wherein the α-olefin polymer is an α-olefin polymer having a triad fraction [mm] of 0.5 or more in the measurement of C$^{13}$-NMR.

3. The aminated olefin polymer as claimed in claim 1, wherein the α-olefin polymer is an α-olefin polymer having a triad fraction [rr] of 0.5 or more in the measurement of C$^{13}$-NMR.

4. The aminated olefin polymer according to claim 1, wherein said α-olefin having 2 to 20 carbon atoms is selected from the group consisting of ethylene, propylene, 1-butene, 1-hexene, 3-methyl-1-butene, 3-methyl-1-pentene, 4-methyl-1-pentene and 3-methyl-1-hexene.

5. The aminated olefin polymer according to claim 1, wherein said α-olefin having 2 to 20 carbon atoms is selected from the group consisting of propylene, 1-butene, 3-methyl-1-butene and 4-methyl-1-pentene.

6. A functionalized polymer according to claim 1, wherein said α-olefin having 2 to 20 carbon atoms is selected from the group consisting of propylene and a mixture of propylene with another α-olefin wherein propylene is predominant.

7. The aminated olefin polymer according to claim 2, wherein said [mm] fraction of the triad is 0.6 or more.

8. The aminated olefin polymer according to claim 3, wherein said [rr] fraction of the triad is 0.6 or more.

9. The aminated olefin polymer according to claim 1, wherein said α-olefin polymer to be modified is obtained by polymerizing an α-olefin having 2 to 20 carbon atoms with a catalyst comprising the combination of a metallocene compound and an alumoxane.

10. A functionalized polymer according to claim 9, wherein said metallocene compound is represented by the following general formula:

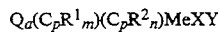

$$Q_a(C_pR^1{}_m)(C_pR^2{}_n)MeXY \qquad [I]$$

wherein: Q represents a bonding group which crosslinks the cyclopentadienyl groups $(C_pR^1{}_m)$ and $(C_pR^2{}_n)$; a denotes an integer of 0 or 1; $C_p$ represents a cyclopentadienyl group or a substituted cyclopentadienyl group; $R^1$ and $R^2$ independently represent hydrocarbyl groups or oxygen-, phosphorus-, nitrogen- silicon-containing hydrocarbyl groups, the hydrocarbyl group being in a linear or a branched configuration; Me represents a transition metal of the groups IVB–VIB in the Periodic Table; X and Y represent independently a hydrogen atom, a halogen atom, a hydrocarbyl group, an alkoxy group, an amino group, a phosphorus-containing hydrocarbyl group or a silicon-containing hydrocarbyl group, in which X and Y may be the same or different; m represents an integer in the range of $0 \leq m \leq 5$ and n represents an integer in the range of $0 \leq n \leq 5$ whereby, when m (or n) is more than one, a plurality of $R^1$ (or $R^2$) can be connected at their terminus to form a ring structure together with the carbon atoms in the cyclopentadienyl group to which $R^1$ (or $R^2$) is bonded and a plurality of each of $R^1$ and $R^2$ may be the same or different.

11. The aminated olefin polymer according to claim 10, wherein said metal is zirconium or hafnium, and $Q_a$ represents a $C_1$ to $C_3$ alkylene group which may or may not have a lower alkyl substituent or a mono or oligo silylene group which may or may not have a lower alkyl substituent.

12. The aminated olefin polymer according to claim 10 wherein said moiety $(C_pR^1{}_m)$ and said moiety $(C_pR^2{}_n)$ are the same.

13. The aminated olefin polymer according to claim 1, wherein said amino group has been introduced into the olefinic unsaturated bond at the terminus by a reaction of the unsaturated α-olefin polymer with a borane, followed by a reaction with an amination reagent.

14. The aminated olefin polymer according to claim 1, wherein said amino group has been introduced into the olefinic unsaturated bond at the terminus by addition of an allylamine through a radical mechanism.

15. The aminated olefin polymer according to claim 1, wherein said amino group has been introduced into the olefinic unsaturated bond at the terminus by a reaction with a carboxylic acid, a derivative of a carboxylic acid or an anhydride of a carboxylic acid, followed by reaction with a polyamine.

16. The aminated olefin polymer according to claim 1, wherein said amino group has been introduced into the olefinic unsaturated bond at the terminus by introduction of an amide group to the unsaturated terminus, followed by reduction into an amino group.

17. The aminated olefin polymer according to claim 1, wherein said amino group has been introduced into the olefinic unsaturated bond at the terminus by introduction of an epoxy group, followed by a reaction with ammonia, or a polyamine.

18. The aminated olefin polymer according to claim 1, wherein said amino group has been introduced into the olefinic unsaturated bond at the terminus by introduction of a halogen to the unsaturated terminus, followed by a reaction with a polyamine.

19. An aminated olefin polymer comprising at least one α-olefin of 2 to 20 carbon atoms having an aminated group replacing the unsaturated terminus of said α-olefin polymer chain.

20. An aminated olefin polymer which is a modified unsaturated α-olefin polymer obtained by polymerizing propylene or a mixture of propylene with another α-olefin having 2 to 12 carbon atoms, propylene being predominant, with a catalyst comprising a combination of a metallocene compound and an aluminoxane and having olefinic unsaturated bond at its terminus, the modification being such that the unsaturated α-olefin polymer is modified to have an amino group added into the olefinic unsaturated bond at the terminus in an amount of no less than 30% of the total number of the olefinic unsaturated bonds in the mass of the unsaturated α-olefin polymer.

21. The aminated olefin polymer of claim 19 wherein said aminated group is —NH$_2$.

22. The aminated olefin polymer of claim 19 wherein said aminated group is allylamine.

23. The aminated olefin polymer of claim 19 wherein said aminated group is an amide moiety.

24. The aminated olefin polymer of claim 19 wherein said aminated group is a polyamine.

* * * * *